US008676002B2

(12) United States Patent
Grenouillet et al.

(10) Patent No.: US 8,676,002 B2
(45) Date of Patent: Mar. 18, 2014

(54) METHOD OF PRODUCING A PHOTONIC DEVICE AND CORRESPONDING PHOTONIC DEVICE

(75) Inventors: Laurent Grenouillet, Rives (FR); Jean-Marc Fedeli, Saint Egreve (FR); Liu Liu, Ghent (BE); Regis Orobtchouk, Fitilieu (FR); Philippe Regreny, Chasselay (FR); Gunther Roelkens, Schellebelle (BE); Pedro Rojo-Romeo, Lyons (FR); Dries Van Thourhout, Ghent (BE)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 175 days.

(21) Appl. No.: 13/147,015

(22) PCT Filed: Feb. 1, 2010

(86) PCT No.: PCT/IB2010/000414
§ 371 (c)(1),
(2), (4) Date: Nov. 14, 2011

(87) PCT Pub. No.: WO2010/086748
PCT Pub. Date: Aug. 5, 2010

(65) Prior Publication Data
US 2012/0063717 A1    Mar. 15, 2012

(30) Foreign Application Priority Data
Feb. 2, 2009    (EP) .................................. 09290077

(51) Int. Cl.
G02B 6/12    (2006.01)
H01L 29/06    (2006.01)
H01L 21/00    (2006.01)

(52) U.S. Cl.
USPC ................... 385/14; 257/E33.023; 438/24

(58) Field of Classification Search
USPC ............ 385/14–16; 216/24; 398/27; 438/24; 257/E33.023
See application file for complete search history.

(56) References Cited

U.S. PATENT DOCUMENTS

| 6,690,845 B1* | 2/2004 | Yoshimura et al. | 385/14 |
|---|---|---|---|
| 7,079,718 B2* | 7/2006 | Welch et al. | 385/14 |
| 7,489,838 B2* | 2/2009 | Kish et al. | 385/14 |
| 2002/0039464 A1* | 4/2002 | Yoshimura et al. | 385/14 |
| 2009/0078963 A1* | 3/2009 | Khodja | 257/189 |

OTHER PUBLICATIONS

Roelkins, G. et al., "Thin film III-V devices . . . waveguide circuits", ECS Transactions—Science and Technology of Dielectrics for Active and Passive Photonic Devices 2006, vol. 3, No. 11, 2006, pp. 101-106, XP002536683.
Fang A W. et al., "Integrated AlGaInAs-silicon . . . and photodetector", Proceedings of SPIE—The International Society for Optical Engineering—Active and Passive Optical Components for Communications VII 2007 SPIE US, vol. 6775, 2007, XP002536684.
Van Thourhout D. et all., "III-V silicon . . . and receivers", Proceedings of SPIE—The International Society for Optical Engineering—Integrated Optics: Devices, Materials, and Technologies XII 2008 SPIE US, vol. 6896, 2008, XP002536685.

* cited by examiner

*Primary Examiner* — Akm Enayet Ullah
(74) *Attorney, Agent, or Firm* — Clark & Brody

(57)    ABSTRACT

Method of producing a photonic device including at least one light source and at least one photodetector on a structure including a waveguide layer, this method comprising the following steps: a) growing successively on a substrate (10), a photodetection structure (11) and a light source structure (12), the photodetection structure and the light source structure being made of a stack of layers, the light source layers being stacked on top of the photodetector layers and both structures sharing one of these layers. b) bonding the structure obtained by step a) to the said waveguide structure (2), the light source structure being in contact with the said waveguide structure (2), c) removing the substrate (10) from the structure obtained by step b), d) etching the structure (3) obtained by step c) to define the at least one photodetector (4), e) etching the structure obtained by step d) to define the at least one light source (5), f) forming electrodes (44, 43; 54, 53) on the least one photodetector (4) and on the least one light source (5).

10 Claims, 3 Drawing Sheets

METHOD OF PRODUCING A PHOTONIC DEVICE AND CORRESPONDING PHOTONIC DEVICE

FIELD OF THE INVENTION

This invention is related to the field of silicon photonics.

BACKGROUND ART

In this emerging field, researches are performed to closely integrate all the basic elements (laser sources, waveguides, modulators, photodetectors) necessary to create photonic functions on top of a CMOS silicon wafer (Complementary Metal Oxide Semiconductor silicon wafer). One of the major goal of these Photonic Integrated Circuits (PIC) is to increase the bandwidth of IC systems, which is up to now limited by electrical interconnects.

From a material point of view, it is well known that silicon (into SiO2) can be used efficiently to create waveguides in a CMOS layer, to route the light in and out of the circuit, with a telecom wavelength comprised between 1.3 and 1.55 µm. However, silicon has a very poor photon emission efficiency.

Therefore, in order to realize laser sources and photodetectors on silicon, a promising and compact approach is to integrate III-V materials, known to have very good photon emission and detection efficiencies, on top of the CMOS layers, by means of die to wafer bonding on silicon wafer. A reference can be found in G. Roelkens et al., III-V/Si photonics by die-to-wafer bonding, Materials Todays 2007, vol.10, n° 7-8, pp. 36-43.

On one die, whose typical dimension is 5×5 mm², thousands of devices, for instance lasers, can be defined.

A typical structure includes a CMOS silicon wafer on the top of which is bonded a die with an active material which, after processing, will define at least one laser and one photodetector. The CMOS silicon wafer comprises a stack of a silicon substrate, an oxide buffer layer and a silicon waveguide layer. In the literature, the laser and the photodetector are both made of the same III-V epitaxial layer stack. Therefore, the laser and the photodetector include the same layers. A reference can be found in G. Roelkens et al., laser emission and photodetection in a InP/InGaAsP layer integrated on and coupled to a Silicon-on-Insulator waveguide circuit, Optics Express 2006, vol. 14, n° 18, pp. 8154-8159 or A. Fang et al., Integrated AlGaInAs-silicon evanescent racetrack laser and photodetector, Optics Express 2007, vol. 15, n° 15, pp. 2315-2322.

By using evanescent coupling, it is possible to couple the light emitted by the laser in the underneath Si/SiO2 waveguide, and further detect it in a photodetector (with the same active layer) using the same principle, therefore realizing a full optical link on silicon.

As it is known in the state of art, evanescent wave coupling is the process by which electromagnetic waves are transmitted from one medium to another by means of the evanescent, exponentially decaying electromagnetic field. In the present case, the laser generates an electromagnetic field which extends to the underlying waveguide. In other words, the spatial distribution of the electromagnetic field is such that part of it reaches the waveguide. If the laser and the waveguide are closely located, the evanescent field generated by the laser does not decay much before it reaches the waveguide.

Concerning evanescent coupling, reference is made to H. Park et al., Hybrid silicon evanescent laser fabricated with a silicon waveguide and III-V offset quantum wells, Optics Express-2005, vol. 13, n° 23, pp 9460-9464 and to H. Hattori et al., Heterogeneous integration of microdisk lasers on silicon strip waveguides for optical interconnects, IEEE Photonics Technology Letters 2006, vol. 18, n° 1, pp. 223-225. G. Roelkens et al., Laser emission and photodetection in a InP/InGaAsP layer integrated on and coupled to a Silicon-on-Insulator waveguide circuit, Optics Express 2006, vol. 14, n° 18, pp. 8154-8159 and A. Fang et al., Integrated AlGaInAs-silicon evanescent racetrack laser and photodetector, Optics Express 2007, vol. 15, n° 5, pp. 2315-2322, are also of interest.

The advantage of this configuration is that a unique bonding step is necessary to realize both lasers and photodetectors with exactly the same III-V layers.

However, the drawback of this configuration is that the lasers and photodetectors performances cannot be optimized independently, in terms of layer thickness and composition. Indeed, the same p-i-n structure is used in one area of the die for emission (p-i-n forward biased) and in another area of the die for detection (p-i-n reverse biased).

This configuration is illustrated by Roelkens G et al., Thin film III-V devices integrated on silicon-on-insulator waveguide circuits, ECS transactions, Science and technology of dielectrics for active and passive photonic devices 2006 Electrochemical Society Inc. US, vol. 3, no. 11, 2006, pages 101-106, and the article of A. Fang et al, mentioned above.

By using the same die-to-wafer technique, it is possible to dedicate dice to laser emission and other ones to photodetection. Reference is made in this regard to work achieved in the frame of the European project PICMOS. The dice, whose composition is different, are optimized for each function, either emission or photodetection.

Therefore, it requires two bonding steps: one for laser dice and one for photodetector dice.

This technique is illustrated by Van Thourhout D et al., III-V silicon heterogeneous integration for integrated transmitters and receivers, Proceedings of Spie, The International Society for Optical Engineering, Integrated Optics: devices, materials, and technologies XII 2008 Spie US, vol. 6896, 2008.

However, the major drawback of this technique is that the distance between a source and a photodetector is ruled by the size of the dice (usually 5 mm×5 mm) and the minimum distance allowed to bond dice (usually several millimetres). Therefore, this technique cannot be used for some important and common applications where, for instance, a monitoring photodiode has to be implemented in close proximity of a laser, that is to say, at a distance of tens of µm.

It is therefore an object of the invention to obviate these drawbacks by proposing a method of producing a photonic device including at least one light source and at least one photodetector on a silicon wafer, this method including a unique bonding step, while enabling the optimization of the performances of the light source and of the photodetector and a close positioning of the light source and of the photodetector.

SUMMARY OF THE INVENTION

The invention thus concerns a method of producing a photonic device including at least one light source and at least one photodetector on a structure including a waveguide layer which comprises the following steps:

a) growing successively on a substrate, a photodetection structure and a light source structure, b) bonding the structure obtained by step a) to the said waveguide structure, the light source structure being in contact with the waveguide structure, c) removing the substrate from the structure obtained by step b)

d) etching the structure obtained by step c) to define the at least one photodetector, e) etching the structure obtained by step d) to define the at least one light source, f) forming electrodes on the least one photodetector and on the least one light source.

As the photodetection structure and the light source structure are made of a stack of layers, both structures can share one of these layers.

This embodiment makes simpler the process according to the invention.

In a preferred embodiment, the shared layer stops the etching in step d).

As the photodetection structure and the light source structure include an active layer between two contact layers, the shared layer can be a contact layer of each structure.

In a preferred embodiment, a contact layer of the photodetection structure stops the removal of the substrate in step c).

The substrate can be a III:V substrate.

The step f) can be obtained by deposition of a layer of an electrical conductor material.

The invention also relates to a photonic device including at least one light source and at least one photodetector on a structure including a waveguide layer, wherein the light source upper contact layer has the same structure and the same positioning than the photodetector bottom contact layer.

In a preferred embodiment, the at least one light source is in direct contact with the waveguide structure and the at least one photodetector is spaced apart the waveguide structure, by means of at least two different layers.

BRIEF DESCRIPTION OF THE DRAWINGS

Preferred embodiments of the invention will now be described with reference to the accompanying drawings, wherein.

DETAILED DESCRIPTION OF THE INVENTION

Figure 1:
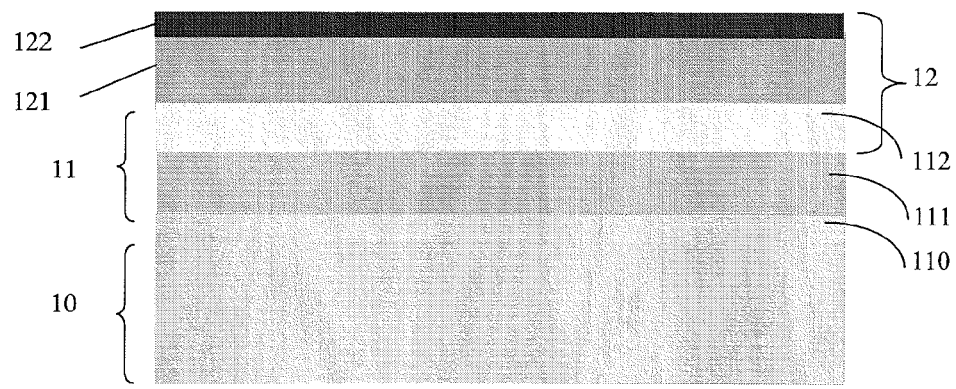
FIGS. 1 to 6 are schematic illustrations of the successive steps of the method according to the invention.

FIG. 1 illustrates the first step of the method according to the invention by showing an epitaxial structure 1 obtained by any suitable process, typically by means of metal organic chemical vapour deposition MOCVD or molecular beam epitaxy MBE techniques.

The process is carried out on a III-V substrate 10 to obtain first the photodetection p-i-n structure 11 and then the light source or laser n-i-p structure 12. Both structures are stacked.

In an example, the growth is performed on a InP substrate.

The photodetection structure 11 includes a upper contact layer 110, an absorbing layer 111 and a bottom contact layer 112. As shown in FIG. 1, the photodetector upper contact layer 110 is in the continuation of the substrate 10 and the absorbing layer 111 is located between the upper contact layer 110 and the bottom contact layer 112.

The light source or laser structure 12 includes a upper contact layer 112, a laser layer 121 and a bottom contact layer 122.

Therefore, as illustrated on FIG. 1, the laser upper contact layer and the photodetector bottom contact layer are merged.

Typical dimensions for the different layers are as follows:

Photodetector upper contact layer 110: between 100 nm and 300 nm.

Absorption layer 111: between 400 nm and 1 μm.

Photodetector bottom contact layer or laser upper contact layer 112: between 100 nm and 300 nm.

Laser layer 121: between 200 nm and 1 μm.

Laser bottom contact layer 122: between 100 nm and 300 nm.

Therefore, the thickness of the epitaxy layers is less than 3 μm when the thickness of the substrate 10 is about 350 μm.

An important point of the structure 1 illustrated on FIG. 1 is that the photodetector bottom contact layer is also the laser upper contact layer. This reduces the thickness of the epitaxy, and the number of processing steps.

The method and the photonic device according to the invention are not limited to this embodiment and the photodetector bottom contact layer and the laser upper contact could be two different layers, obtained successively.

Figure 2:
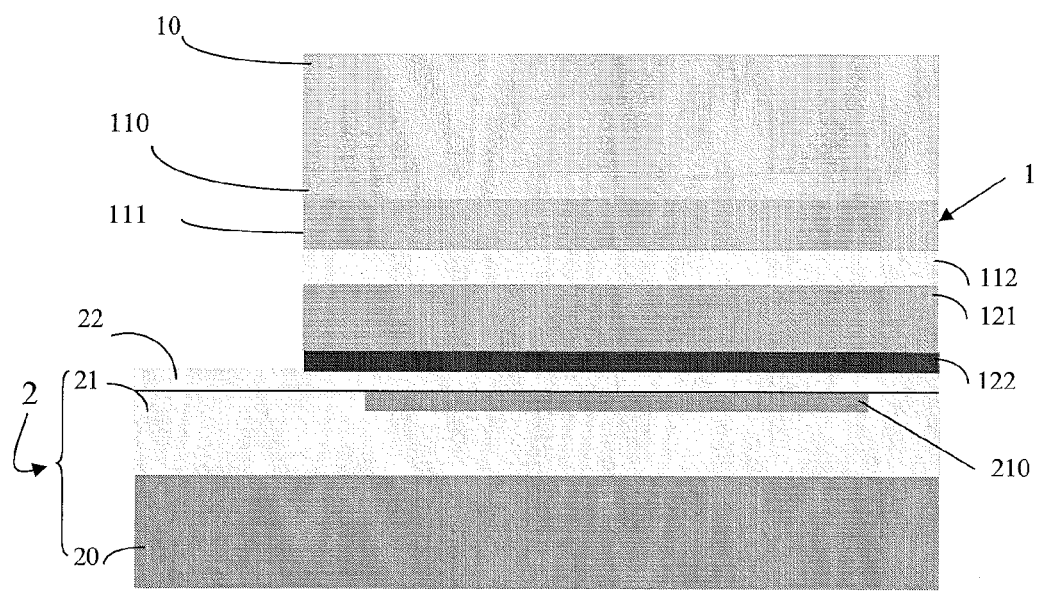

As shown on FIG. 2, the structure 1 is then bonded, by means of a die to wafer process for instance, to a SOI wafer 2. The SOI wafer 2 includes a Si substrate 20, a layer 21 including a Si waveguide 210 and a bonding layer 22.

The structure 2 can be obtained either from:

A SOI wafer including successively a Si substrate, a buried oxide (BOX) and a crystalline Si layer or A Si substrate, a silicon dioxide deposited layer, and an amorphous silicon deposition layer.

Then the Si waveguide 210 is obtained by hard mask SiOx deposition, photolithography, and etching. The waveguide is then covered by SiOx and the surface is planarized by Chemical Mechanical Polishing (CMP) to obtain the bonding layer 22.

The structure 1 is bonded to the structure 2 in such a way that the laser bottom contact layer 122 is in contact with the bonding layer 22.

The substrate 10 is then mechanically and chemically removed by any suitable etching process.

The removal of the substrate can also take place before bonding the structure 1 to the structure 2, but the removal is more difficult to obtain at that stage.

Figure 3:
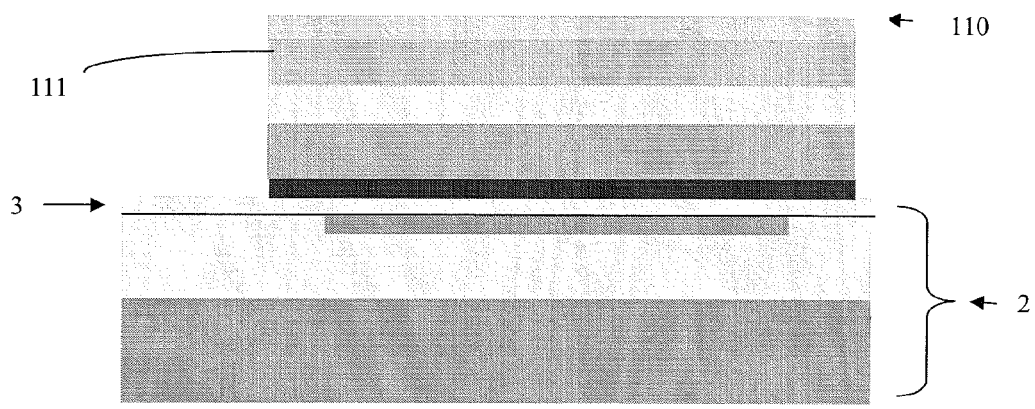

It must be pointed out that the photodetector upper contact layer 110 has a composition different from the substrate 10 and thus plays the role of an etch stop layer. The structure 3 resulting from this etching is illustrated by FIG. 3.

Then, by means of standard clean room process, like photoresist deposition, photolithography or ebeam lithography, and etching, the photodetector definition can be performed.

Figure 4:
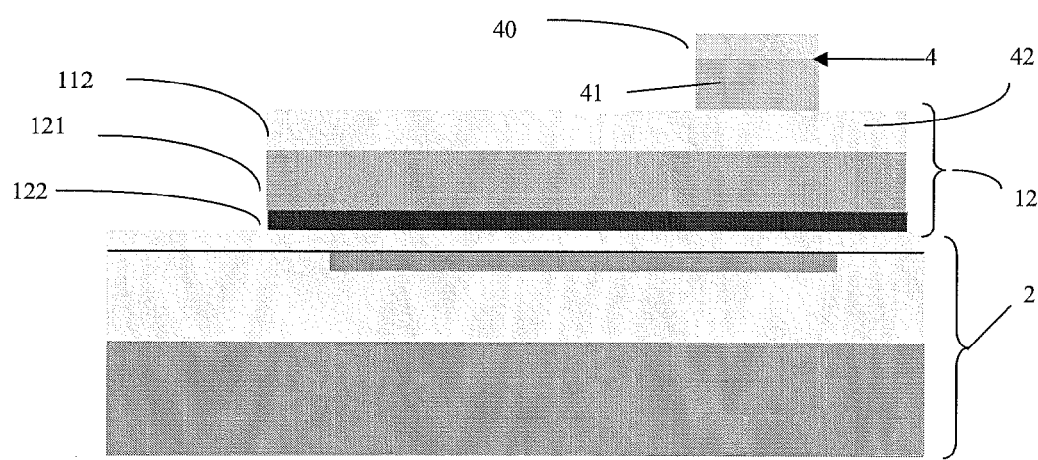

FIG. 4 illustrated the resulting structure, which includes the structure 2, the light source or laser structure 12 and a photodetector 4. The photodetector comprises a bottom contact layer 42 which is the laser upper contact layer 112, an absorbing layer 41 resulting from layer 111, and a upper contact layer 40 resulting from layer 110.

The laser geometry can then be defined by dry or wet etching.

Figure 5:
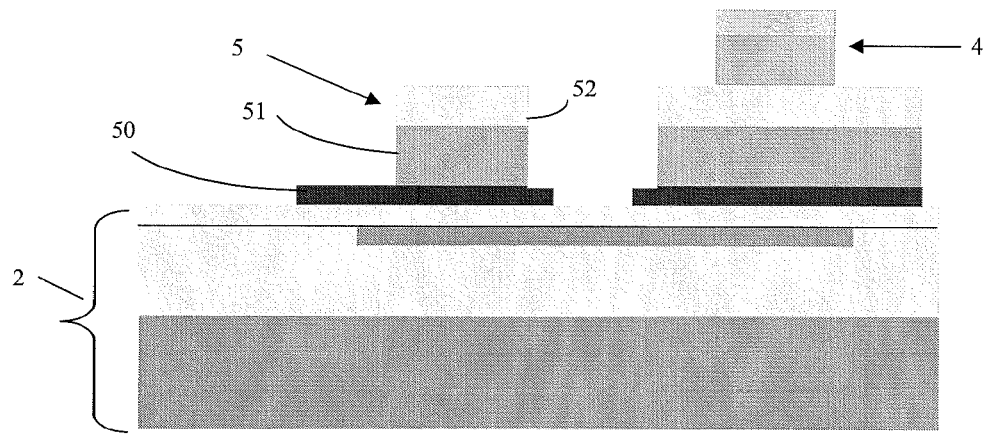

The resulting structure is illustrated by FIG. 5 which includes the structure 2, the photodetector 4 and the laser 5.

As a matter of course, several photodetectors and several lasers could be obtained simultaneously.

The laser comprises a bottom contact layer 50 which results from the laser bottom contact layer 122, a laser layer 51 resulting from layer 121, and a upper contact layer 52 resulting from the laser upper contact layer 112.

Figure 6:
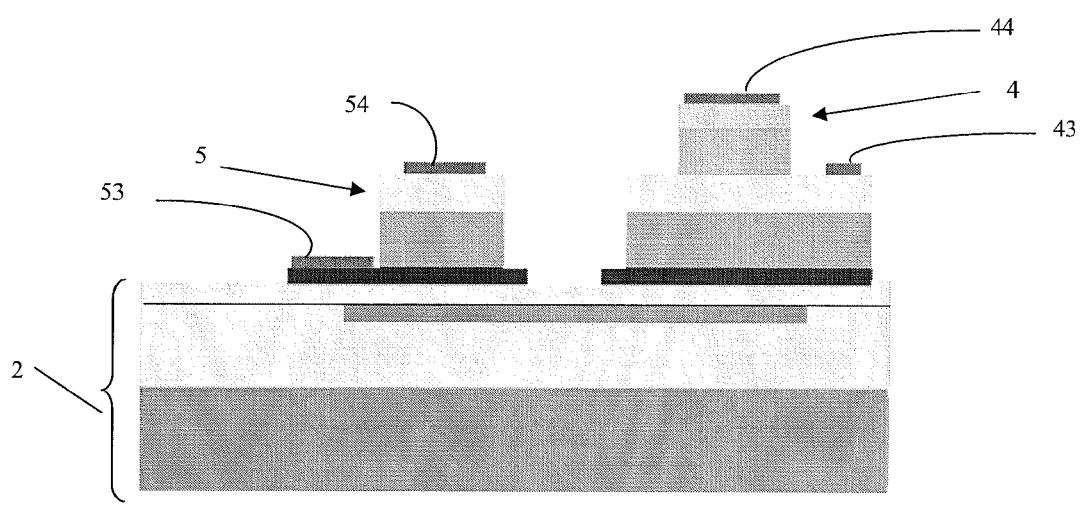

The last step of the process according to the invention is illustrated by FIG. 6, and it is an electrode deposition step. The electrodes of the photodetector 4 are referenced 43 and 44 while the ones of the laser 5 are referenced 53 and 54.

Figure 7:
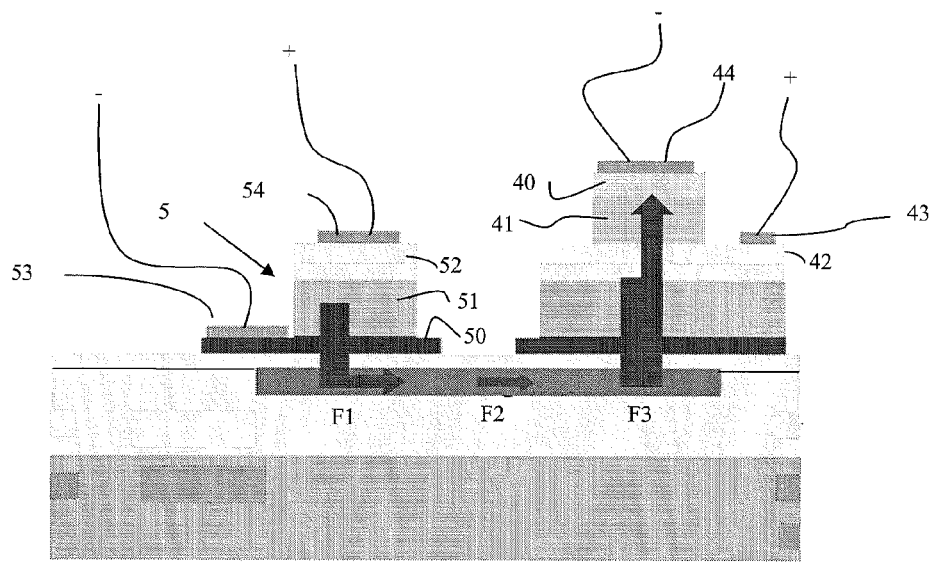
FIG. 7 is a cross-sectional schematic view of a photonic device obtained by the method according to the invention and it illustrates the operation of the device.

FIG. 7 illustrates how light is generated, guided, and detected in the complete link (forward bias for the laser, reverse bias for the photodetector).

The laser is a forward biased p-i-n diode, at a current above the threshold current, in order to obtain the laser effect. The light emitted by the laser is coupled in the underlying waveguide (F1), then spreads in the waveguide (F2), and finally is coupled in the photodetector which is a reverse biased p-i-n diode (F3).

Examples of the different layers described in reference with FIGS. 1 to 6 shall now be given. They correspond to layers obtained when III-V growth is performed on InP substrates.

The photodetector upper contact layer 110 can be a 100 nm thick highly p-doped $In_{0.53}Ga_{0.47}As$ (lattice matched to InP) layer which is commonly used to take a p type ohmic contact.

The etching selectivity between the InP substrate 10 and $In_{0.53}Ga_{0.47}As$ is extremely high with the etching mixture HCl/H2O, 3/1. Therefore, in the frame of the invention, the $In_{0.53}Ga_{0.47}As$ layer 110 fulfils two functions: it contributes to the definition of the photodetector, but it also has the function of an etch stop layer during substrate removal. The structure 3 after removal of the substrate is illustrated on FIG. 3.

The absorption layer 111 can be 500 nm thick and undoped. It is also made of $In_{0.53}Ga_{0.47}As$ which has a strong absorption (>4000cm-1) at telecom wavelength (1.3 µm-1.55 µm).

The photodetector bottom contact layer 112 can be a n doped InP layer which defines the bottom of the photodiode (p-i-n structure) and the top of the laser structure (standard n-i-p structure or tunnel junction n-n$^+$-p$^+$p-i-n structure). It is therefore also the laser upper contact layer. In the case of a tunnel junction (n$^+$-p$^+$) structure as shown in FIG. 7, a quaternary material such as InGaAsP (energy gap corresponding to 1.3 µm) lattice matched to InP is a relevant choice.

The laser layer 121 can be around 400 nm thick and composed of an undoped separate confinement heterostructure (so-called SCH) in which active region such as quantum wells or quantum dots are grown. The active layer is composed of either InGaAsP or AlGaInAs-based quaternary compounds.

The laser bottom contact layer 122 can be made of a ~200 nm thick InP layer which is n doped in the case of a tunnel junction approach or p doped for a standard approach. The tunnel junction approach is preferred to couple light efficiently from the laser to the waveguide, since holes absorb more light than electrons (the ratio absorption coefficient of the holes/absorption coefficient of the electrons is 10).

As explained in reference with FIG. 4, by means of standard clean room process, the photodetector definition can be performed.

This standard process can be photoresist deposition, photolithography or ebeam lithography, or etching.

The very good etching selectivity between InGaAs and InP (with H2SO4/H2O2/H2O wet etching for instance) is very convenient to stop the etching on the photodetector bottom contact layer 112.

As explained in reference to FIG. 5, the laser geometry can then be defined by dry etching for instance Reactive Ion Etching with $CH_4/H_2$ or Inducely Coupled Plasma etching with $Cl_2/H_2$.

The light coupling between the waveguide and the photodetector region where light will be absorbed is performed either by an evanescent effect or by a guide to guide effect. These two effects will be described thereafter.

In case of coupling by evanescent effect, an optical simulation was performed with CAMFR (CAvity Modelling FRamework). It shows that light coming from the waveguide is quickly transferred to the laser layer and then to the photodetector layer, allowing more than 90% of the light travelling in the waveguide to be photodetected in only 40 µm length (for a 100 nm thick SiO2 bonding layer. The performance of the device is close to the performance of prior art devices but the size of a device according to the invention is typically less than 50 µm when the size of a prior art device is typically more than 500 µm.

Figure 8:
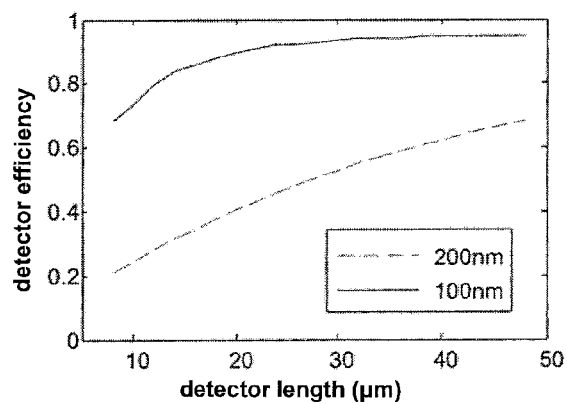
FIG. 8 is a curve representing the photodetection efficiency as a function of the photodetector length.

FIG. 8 comprises two curves representing the photodetection efficiency as a function of the photodetector length, and for a thickness of the oxide layer, or bonding layer, taken between the waveguide and the epitaxy layers of 100 nm (-)or 200 nm (- - -).

The simulations were carried out with a laser having a thickness of 500 nm and a photodetector made of InGaAs and having also a thickness of 500 nm and with Au electrodes.

FIG. 8 shows that the coupling efficiency increases when the length of the detector increases and when the thickness of the bonding layer decreases.

The detector length is typically in the range 20 µm-100 µm. Some diffraction losses can occur at the interfaces where the photodetector is geometrically defined.

FIG. 8 also shows that, as an example, with a bonding layer having a thickness of 100 nm, more than 90% of the light spreading in the waveguide is absorbed in less than 40 µm.

The coupling by guide to guide effect is used to increase the compactness of the photodetector. As known by a person skilled in the art, this effect can be obtained with a special design of the waveguides. The principle of the device can be understood by referring to FIG. 9.

The photodetector 4 is provided with a guide to guide coupler 6. The width of the coupler is much smaller than the one of the photodetector. An adiabatic taper 7 is thus provided in the laser source waveguide between the coupler and the photodetector.

The coupler and the taper are obtained through additional photolithography steps.

Figure 9:
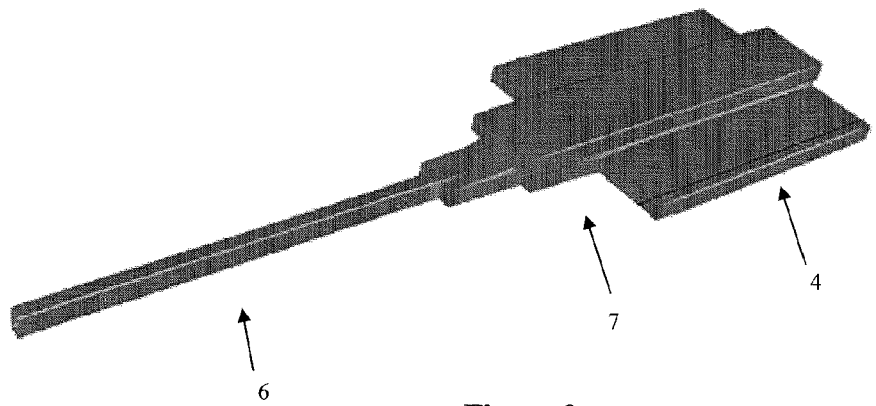
FIG. 9 is a schematic perspective sketch of an embodiment of a photodetector according to the invention.

The light of the silicon waveguide is first transferred in the laser source epilayers by a guide to guide effect. The phase matching condition between the silicon and the source waveguide is obtained by a correct choice of the source waveguide width. Modeling shows that a width of 0.38 µm for the source waveguide is necessary to have a coupling efficiency of 100% between the two waveguides for a silicon waveguide of 0.5 µm width. The performance of the photodetector is almost the same when its operation is based on evanescent coupling or on coupling by guide to guide effect. However, a photodetector as illustrated on FIG. 9 presents a higher compactness. For a spacing between the two waveguides of 0.2 µm, the coupling length is about 8 µm.

Then the light is injected in the photodetector epilayers. In order to reduce the losses induced by the diffraction at the boundary between the source and photodetector epilayers, the depth of the layer stack must be chosen in such a way that the fundamental mode profile of the source epilayers waveguide is matching the first order mode of the waveguide in the layer stack part of the photodetector.

By using the guide to guide effect, the size of the photodetector can be reduced to 2 µm large and 10 µm long. In order to realize the metallization on the photodetector, a width of 2 µm is needed. An adiabatic taper in the source waveguide is used to enlarge the width of 0.38 µm to 2 µm.

The total length of the device is about 24 µm and the length of the photodetector is reduced to 10 µm. The small size of the photodetector will lead to a small capacitance for this device, which should allow for a very high frequency operation for such a photodetection device.

The previous description shows that, with the method according to the invention, a photonic device can be obtained in which the performances of the light source(s) and of the photodetector(s) can be optimized independently. Indeed, the layers constituting the light source(s) and the photodetector(s) are realized successively and can be adapted to the expected performances. However, the layers are obtained during the same epitaxy and therefore, the process is not complex.

Moreover, the process enables to obtain a photonic device in which the light source(s) and the photodetector(s) can be closely positioned. Indeed, it is not necessary to bond independently the light source(s) and the photodetector(s) on the silicon wafer. Therefore, the minimum distance between the light source(s) and the photodetector is not set by the bonding techniques, but by the lithography resolution. The latter is less than 1 µm.

It can be also pointed out that epitaxy can be made simpler by designing the photodetection structure and the light source structure with a shared layer. In the previous description, this shared layer is the laser upper contact layer and the photodetector bottom contact layer, referenced 112.

Moreover, the composition of this shared layer can be chosen so that this layer fulfils the function of an etch stop layer during the process according to the invention. This particular choice also makes the process simpler.

If the shared layer does not fulfil the function of an etch stop layer, the etching of the layers 122 and 121 is carried out by plasma-etching and not by chemical etching.

The photodetector upper contact layer 110 can be chosen in order to stop the removal of the substrate during the process according to the invention. This contributes to the simplification of the process.

It can also be pointed out that, as the absorbing layer 111 is the upper layer, it can be selectively removed, anywhere it is necessary to do so. It will not impact the laser performances.

Moreover, the absorption coefficient of InGaAs material being high, only a small surface is needed to detect the major part of the light emitted by the laser.

Finally, the photodetector layer can be used as monitoring photo diode for the laser.

It can be noted that other materials can be used. InGaAsP or AlGaInAs alloys can also be used when the photodetector bottom contact layer 112 is a InP layer and GaAsN, InGaAs, InGaAsSb, InGaAsSbN, GaAsSb and GaAsSbN can be used when the photodetector bottom contact layer 112 is a GaAs layer.

As shown by FIG. 8, in practice, the presence of layers resulting from layers 121 and 122 between the SOI wafer and the photodetector 4 does not impede light detection as long as their absorption is low at the propagation wavelength considered.

The process according to the invention is thus an interesting way of producing photonic integrated circuits (PIC).

The invention claimed is:

1. Method of producing a photonic device including at least one light source and at least one photodetector on a structure including a waveguide layer, this method comprising the following steps:
    a) growing successively on a substrate (10), a photodetection structure (11) and a light source structure (12), the photodetection structure and the light source structure being made of a stack of layers, the light source layers being stacked on top of the photodetector layers and both structures sharing one of these layers,
    b) bonding the structure obtained by step a) to the said waveguide structure (2), the light source structure being in contact with the said waveguide structure (2),
    c) removing the substrate (10) from the structure obtained by step b),
    d) etching the structure (3) obtained by step c) to define the at least one photodetector (4),
    e) etching the structure obtained by step d) to define the at least one light source (5),
    f) forming electrodes (44, 43; 54, 53) on the least one photodetector (4) and on the least one light source (5).

2. Method according to claim 1, wherein the shared layer (112) stops the etching in step d).

3. Method according to claim 1, wherein the photodetection structure (11) and the light source structure (12) include an active layer (111, 121) between two contact layers (110, 112; 112, 122), the shared layer (112) being a contact layer of each structure.

4. Method according to claim 3, wherein a contact layer (110) of the photodetection structure (11) stops the removal of the substrate (10) in step c).

5. Method according to claim 1, wherein the substrate is a III-V substrate.

6. Method according to claim 1, wherein step f) is obtained by deposition of a layer of an electrical conductor material.

7. Photonic device including at least one light source (5) and at least one photodetector (4) on a structure (2) including a waveguide layer, the photodetector and the light source being made of a stack of layers, each stack including an active layer (51, 41) between an upper contact layer (52, 40) and a bottom contact layer (50, 42), wherein the light source upper contact layer (52) has the same structure and the same positioning as the photodetector bottom contact layer (42).

8. Photonic device according to claim 7, wherein the at least one light source (5) is in direct contact with the waveguide structure (2) and the at least one photodetector (4) is spaced apart the waveguide structure, by means of at least two different layers.

9. Photonic device including at least one light source (5) and at least one photodetector (4) on a waveguide structure (2) including a waveguide layer, the photodetector and the light source being made of a stack of layers, each stack including an active layer (51, 41) between and in contact with a bottom contact layer (50, 42) which is closer to the waveguide structure (2) than the active layer (51, 41), and an upper contact layer (52, 40) which is opposite the bottom contact layer, wherein the light source bottom contact layer (50) is in contact with the waveguide structure (2) and the light source upper contact layer (52) has the same structure and the same positioning relative to the waveguide structure as the photodetector bottom contact layer (42).

10. Photonic device according to claim 9, wherein at least one photodetector (4) is spaced apart from the waveguide structure, by means of at least two different layers, which have the same structure and the same positioning relative to the waveguide structure (2) as the light source active layer (51) and the light source bottom contact layer (50).

\* \* \* \* \*

UNITED STATES PATENT AND TRADEMARK OFFICE
CERTIFICATE OF CORRECTION

| | | |
|---|---|---|
| PATENT NO. | : 8,676,002 B2 | Page 1 of 1 |
| APPLICATION NO. | : 13/147015 | |
| DATED | : March 18, 2014 | |
| INVENTOR(S) | : Grenouillet et al. | |

It is certified that error appears in the above-identified patent and that said Letters Patent is hereby corrected as shown below:

On the title page, insert item (73)

--Commissariat a L'Energie Atomique et aux Energies Alternatives, Paris (FR);

Centre National de la Recherche Scientifique, Paris (FR);

IMEC, Leuven (BE);

Universiteit Gent, Gent (BE) --

Signed and Sealed this
Twenty-fourth Day of May, 2016

Michelle K. Lee
*Director of the United States Patent and Trademark Office*